US007110050B2

(12) United States Patent
Correa et al.

(10) Patent No.: US 7,110,050 B2
(45) Date of Patent: Sep. 19, 2006

(54) METHOD FOR PROCESSING VIDEO PICTURES FOR DISPLAY ON A DISPLAY DEVICE USING SELF-PRIMING AND REFRESHING SUB-FIELDS

(75) Inventors: Carlos Correa, Villingen-Schwenningen (DE); Sébastien Weitbruch, Mönchweiler (DE); Rainer Zwing, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 595 days.

(21) Appl. No.: 10/182,453

(22) PCT Filed: Jan. 13, 2001

(86) PCT No.: PCT/EP01/00382

§ 371 (c)(1),
(2), (4) Date: Jul. 26, 2002

(87) PCT Pub. No.: WO01/56003

PCT Pub. Date: Aug. 2, 2001

(65) Prior Publication Data

US 2003/0043304 A1 Mar. 6, 2003

(30) Foreign Application Priority Data

Jan. 26, 2000 (EP) .................................. 00250025
Feb. 25, 2000 (EP) .................................. 00250066

(51) Int. Cl.
*H04N 3/12* (2006.01)
*H04N 5/66* (2006.01)

(52) U.S. Cl. ......................... 348/797; 348/795; 345/63

(58) Field of Classification Search ................ 348/795, 348/797, 678, 687; 345/63, 76, 77, 102; 313/622; 315/169.4
See application file for complete search history.

(56) References Cited

U.S. PATENT DOCUMENTS 4,130,777 A * 12/1978 De Jule ..................... 345/74.1
5,187,578 A 2/1993 Kohgami et al. ........... 358/168
5,233,272 A * 8/1993 Whang et al. .............. 315/168

(Continued)

FOREIGN PATENT DOCUMENTS

EP 833 299 A1 4/1998

(Continued)

*Primary Examiner*—Victor R. Kostak
(74) *Attorney, Agent, or Firm*—Joseph J. Laks; Harvey D. Fried; Sammy S. Henig

(57) ABSTRACT

The invention is related to a new kind of plasma display panel control. A known principle for PDP control is based on a combination of sub-field addressing and priming. Within the priming period all the plasma cells of the panel are pre-excited by a strong voltage pulse. This treatment of the cells produces a slight background luminance which is a drawback for picture quality aspects because the achievable contrast is reduced. According to the invention it is proposed to use self-priming sub-fields and refreshing sub-fields instead of this hard priming period. With these concepts it is assured that the cells which ought to be black remain black. Self-priming sub-fields reduce or eliminate the need for priming, thus making dark areas darker, while refreshing sub-fields, can be addressed faster. In practice, the number of refreshing sub-fields in a frame period is higher than the number of the self-priming sub-fields. Therefore, the total addressing time can be reduced with this new technique. The faster addressing leaves more time for sustain pulses, thus allowing bright areas that are brighter. This is especially advantageous for PDP monitors connected to 75Hz multimedia sources.

14 Claims, 2 Drawing Sheets

U.S. PATENT DOCUMENTS

| | | | | |
|---|---|---|---|---|
| 6,252,568 | B1 * | 6/2001 | Iseki et al. | 345/60 |
| 6,268,890 | B1 * | 7/2001 | Kawahara | 348/739 |
| 6,278,422 | B1 * | 8/2001 | Ukai et al. | 345/63 |

FOREIGN PATENT DOCUMENTS

| | | | |
|---|---|---|---|
| EP | 834 856 | A1 | 4/1998 |
| EP | 836 171 | A2 | 4/1998 |

* cited by examiner

METHOD FOR PROCESSING VIDEO PICTURES FOR DISPLAY ON A DISPLAY DEVICE USING SELF-PRIMING AND REFRESHING SUB-FIELDS

This application claims the benefit under 35 U.S.C. §365 of International Application PCT/EP01/00382, filed Jan. 13, 2001, which claims the benefit of European Patent Application No. 00250066.8 filed Feb. 25, 2000 and European Patent Application No. 00250025.4, filed Jan. 26, 2000.

The invention relates to a method for processing video pictures for display on a display device. More specifically the invention is closely related to a kind of video processing for improving the picture quality of pictures which are displayed on matrix displays like plasma display panels (PDP) or other display devices where the pixel values control the generation of a corresponding number of small lighting pulses on the display.

BACKGROUND

The Plasma technology now makes it possible to achieve flat colour panel of large size (out of the CRT limitations) and with very limited depth without any viewing angle constraints.

Referring to the last generation of European TV, a lot of work has been made to improve its picture quality. Consequently, a new technology like the Plasma one has to provide a picture quality as good or better than standard TV technology. On one hand, the Plasma technology gives the possibility of "unlimited" screen size, of attractive thickness . . . but on the other hand, it generates new kinds of artefacts which could degrade the picture quality.

Most of these artefacts are different as for CRT TV pictures and that makes them more visible since people are used to see the old TV artefacts unconsciously.

A Plasma Display Panel (PDP) utilizes a matrix array of discharge cells which could only be "ON" or "OFF". Also unlike a CRT or LCD in which grey levels are expressed by analogue control of the light emission, a PDP controls the grey level by modulating the number of light pulses per frame (sustain pulses). This time-modulation will be integrated by the eye over a period corresponding to the eye time response.

To achieve a good image quality, contrast is of paramount importance. On Plasma Display Panels (PDPs) contrast values are inferior to those achieved for CRTs due to following 2 reasons:

In PDPs a priming process which makes a pre-excitation of the plasma cells is required to prepare the cells for homogeneous light emission in sub-fields. This priming process has on the other hand the negative effect that a panel background light is generated.

Large time is used for addressing in PDPs, which reduces the level of achievable light output.

INVENTION

To overcome the drawback of reduced contrast, the present invention, reports a technique that increases contrast of a PDP by the use of "self-priming" and "refreshing sub-fields".

Self-priming sub-fields reduce or eliminate the need for priming, thus making dark areas darker, while refreshing sub-fields, can be addressed faster. In practice, the number of refreshing sub-fields in a frame period is higher than the number of the self-priming sub-fields. Therefore, the total addressing time can be reduced with this new technique.

Faster addressing leaves more time for sustain pulses, thus allowing bright areas that are brighter. This is especially true for PDP monitors connected to 75 Hz multimedia sources, because in order to have an acceptable number of sub-fields, picture power is normally limited for 75 Hz sources. In 50 Hz and 60 Hz modes, where picture power is normally limited by the power electronics, a reduced addressing time may be alternatively used for increasing the number of sub-fields and thus improving picture quality. Please note, that the false contour effect occurring in PDPs can be reduced if the number of sub-fields in a frame period is increased. Known solutions always use a single type of sub-field addressing (homogeneous addressing), thus no splitting in self-priming and refreshing sub-fields (heterogeneous addressing).

In homogeneous addressing modes the use of priming pulses is common. Two types of priming pulses can be distinguished: hard-priming pulses (square form pulses, with very large increasing slope, produce more background light), which are used once per frame period, and soft-priming pulses (triangular form pulses, with reduced increasing slope, produce less background light) which are presently used once per sub-field. Hard-priming, creates more background luminance, which reduces achievable contrast factor. Soft-priming creates less background luminance per pulse, but because soft-priming usually creates more pulses per frame, total result may be even worse. Picture quality is reduced in both modes.

Heterogeneous addressing as proposed in this invention reduces the need for priming and at the same time reduces the total required addressing time. Contrast and picture quality are improved. Less priming means less background light, dark areas become darker, achieving in this way larger contrast values.

Plasma technology requires for the successful writing of a cell a pre-excitation. By delivering a large writing pulse with high energy to all cells this excitation is achieved. This writing pulse is the above mentioned priming pulse. These kind of writing pulses, which correspond to a small electric discharge, produce background luminance, which reduces contrast, because the known priming is applied to all cells even those that should be black.

As mentioned above, the inventive concept concerns the use of self-priming sub-fields and refreshing sub-fields. Self-priming sub-fields are positioned preferably at the beginning of a frame period. They make unnecessary the need of dedicated external priming pulses, because they generate themselves the charge for the required pre-excitation. And the problem of background luminance will not occur because the writing pulse in the self-priming sub-fields are not applied to cells which shall be black, only to the cells corresponding to non-zero pixel values where illumination is anyhow wanted. Self-priming sub-fields may require more time for writing than normal sub-fields, and thus the number of self-priming sub-fields shall be small, e.g. one or two self-priming sub-fields in a frame period is enough and increasing the number would be more and more unpractical.

One further aspect of the invention is to apply a modified sub-field coding process, so that for all input video levels that are different from zero, at least one of the self-priming sub-fields is activated, which means that the corresponding lighting period of this self-priming sub-field is switched on.

For cells that should be black, no sub-field is activated, which means that they are not primed, and thus they do not display a background luminance as wanted. For all other cells, at least one of the self-priming sub-fields is activated and the corresponding writing pulse is produced, achieving in this way the required priming of the cell. The following sub-fields, occurring after a successful cell writing/priming, have the additional function of refreshing the state of cell excitation.

There is the rule that the longer the interval between two cell writing pulses, the longer the writing pulse for refreshing must be. It is therefore an aspect of the invention to use an optimised sub-field coding process for refreshing so that the interval between the writing pulses is minimised. With the solution according to the invention the cell writing repetition interval is minimized to a maximum of one sub-field off.

A further aspect of the invention is how the concept of self-priming and refreshing sub-fields can be combined with a specific sub-field organisation and sub-field coding process for reducing the large area flicker effect when the plasma display is running in 50 Hz frame repetition mode. The corresponding measures are claimed in claims 8 to 12.

DRAWINGS

Exemplary embodiments of the invention are illustrated in the drawings and are explained in more detail in the following description.

EXEMPLARY EMBODIMENTS

Figure 1:
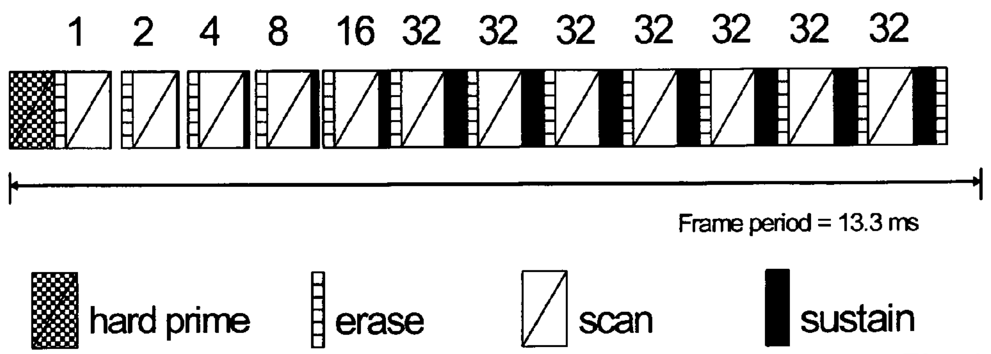
Fig. 1 PRIOR ART
FIG. 1 shows an example of a sub-field organisation without the inventive concept.

As above mentioned this invention applies the new concept of using self-priming sub-fields and refreshing sub-fields for PDP control.

In the following this concept is explained in detail.

At first, the term sub-field is defined: A sub-field is a period of time in which successively the following is being done with a cell:

1. There is a writing/addressing period in which the cell is either brought to an excited state with a high voltage or with lower voltage to a neutral state.
2. There is a sustain period in which a gas discharge is made with short voltage pulses which lead to corresponding short lighting pulses. Of course only the cells previously excited will produce lighting pulses.

There will not be a gas discharge in the cells in neutral state.

3. There is an erasing period in which the charge of the cells is quenched.

Now the term "Self-Priming Sub-field" is defined: A sub-field may be called "self-priming sub-field" if a sub-field has one or more of the following characteristics:

1. Lower Addressing Speed:

A longer writing pulse increases the probability of cell writing. More time is required for addressing, but this added time is acceptable due to the reduced number of self-priming sub-fields.

2. Higher Writing Voltage:

A higher writing voltage is applied to the cell for the self-priming sub-fields. This calls for the need of specific PDP driver circuits. The power dissipation change in the drivers is acceptable because the number of self-priming sub-fields is small compared to the total number of sub-fields.

3. Dual Writing Pulses:

Self-priming sub-fields are written twice. The first writing cycle pre-excites the cell, and the second writing cycle completes the writing process: The order in which the lines of the PDP are written may be as follows:

1 2 3 4 . . . 479 480 1 2 3 . . . 480

It can be advantageous to use a different line writing sequence where two writing pulses are applied to each cell in short succession, for instance by using the following line writing sequence (the second writing pulse is underlined):

1__2 1 3 2 4 3 5 4 6 5 7 6 8 7 . . .

or even:

1__2__3 1 4 2 5 3 6 4 7 5 8 6 . . .

The line drivers are usually connected in a chain, forming a large shift register, with up to 480 cells, one per panel line. By shifting this register left and right, the panel lines can be easily addressed in the above order.)

4. Soft Priming Pulse:

A self-priming sub-field may include a soft priming pulse. In comparison to hard priming where the priming pulse applied to all cells in parallel is of rectangular form with steep edges and high energy, there exists the term "soft priming" in literature for priming pulses of different form, e.g. triangular form and reduced energy. Such a soft priming pulse may be applied to the cells ahead of a sub-field. By restricting soft priming only to the sub-fields at the beginning of a frame period, or to the first sub-field exclusively, background luminance can also be reduced. However this technique should preferably be avoided, because as already mentioned, every priming pulse degrades contrast.

As a result, the self-priming sub-fields are addressed in a different way as the other sub-fields. It was already mentioned that the concept of self-priming sub-fields also implies a specific sub-field coding process. This principle will be explained, now.

A self-priming sub-field can only perform its priming function if all cells, that should not be black, are excited by at least one of the self-priming sub-fields. Therefore, a self-priming code is characterised by the fact, that except for code 0 (black), all other codes have at least one of the self-priming sub-fields activated. Most useful implementations will have either 1 or 2 self-priming sub-fields in a frame period.

Next, an example with 1 self-priming sub-field out of 8 subfields per frame period is shown. For simplicity it is assumed here, that with the 8 sub-fields only 32 discrete levels can be coded.

The sub-field organisation is as follows where the first sub-field is the self-priming sub-field.

1-1-2-3-4-4-8-8

The 32 levels have the following code words:

| | |
|---|---|
| 0: 0000 0000 | 16: 1110 1010 |
| 1: 1000 0000 | 17: 1101 1010 |
| 2: 1100 0000 | 18: 1011 1010 |
| 3: 1010 0000 | 19: 1111 1010 |
| 4: 1110 0000 | 20: 1110 1110 |

-continued

| | |
|---|---|
| 5: 1101 0000 | 21: 1101 1110 |
| 6: 1011 0000 | 22: 1011 1110 |
| 7: 1111 0000 | 23: 1111 1110 |
| 8: 1110 1000 | 24: 1110 1011 |
| 9: 1101 1000 | 25: 1101 1011 |
| 10: 1011 1000 | 26: 1011 1011 |
| 11: 1111 1000 | 27: 1111 1011 |
| 12: 1110 1100 | 28: 1110 1111 |
| 13: 1101 1100 | 29: 1101 1111 |
| 14: 1011 1100 | 30: 1011 1111 |
| 15: 1111 1100 | 31: 1111 1111 |

As required, the first sub-field is always activated for all codes, except for code 0.

Next, an example with 2 self-priming sub-fields and a sub-field organisation with 6 sub-fields and 33 discrete levels is shown:

1-2-3-5-8-13

The 33 levels have the following code words:

| | |
|---|---|
| 0: 000 000 | 17: 101 110 |
| 1: 100 000 | 18: 011 110 |
| 2: 010 000 | 19: 111 110 |
| 3: 110 000 | 20: 010 101 |
| 4: 101 000 | 21: 110 101 |
| 5: 011 000 | 22: 101 101 |
| 6: 111 100 | 23: 011 101 |
| 7: 010 100 | 24: 111 101 |
| 8: 110 100 | 25: 101 011 |
| 9: 101 100 | 26: 011 011 |
| 10: 011 100 | 27: 111 011 |
| 11: 111 100 | 28: 010 111 |
| 12: 101 010 | 29: 110 111 |
| 13: 011 010 | 30: 101 111 |
| 14: 111 010 | 31: 011 111 |
| 15: 010 110 | 32: 111 111 |
| 16: 110 110 | |

Again as required, one of the first two sub-fields is always activated for all codes, except for code 0.

Next, the term refreshing sub-field will be explained. A sub-field may be called "refreshing sub-field" if a sub-field has one or more of the following characteristics:

1. Higher Addressing Speed.

Here, shorter writing pulses are used for bringing the cells in either neutral or excited state. This can be done because the cells have been written before in a self-priming sub-field which improves the writing behaviour for the next sub-fields. It seems that the cells have memorised how they have been treated before.

2. Lower Writing Voltage.

A lower writing voltage can be used for addressing the refreshing sub-fields.

It was already mentioned before that the concept of refreshing sub-fields also implies a specific sub-field coding process. This principle will be explained, hereinafter.

For a refreshing code there is the following rule: A sub-field code is called a refreshing code, if for all input values, there is never more than one inactivated sub-field between two activated sub-fields in the code word.

It can be proved that a code can always be designed with the refreshing property, if the underlying series of the sub-field weights in a sub-field organisation grows slower than the Fibonacci series:

1-2-3-5-8-13-21-34-55-89 . . .

In other words, a given sub-field in a sub-field organisation has never a higher weight than the sum of the previous 2 sub-field weights. A code with this property will be referred as Fibonacci sub-field code. Both above given self-priming code tables are also Fibonacci code tables, and indeed, there is never more than one consecutive '0' between two '1's.

Note: There are some refreshing codes that are not Fibonacci codes. These codes are however not so interesting for PDP applications because they do not compact the sub-fields used around the least significant weights. As an example of such codes consider a sub-field organisation with 5 sub-fields and the weights 1-2-2-2-5 where the value 8 should be coded as 10101 and not as 11001 which is not a valid refreshing code. For all practical purposes, refreshing codes are Fibonacci codes, and all Fibonacci codes are refreshing codes.

Above explained principles are now illustrated with a practical example where 256 different luminance levels can be coded. But it is mentioned that values in an actual implementation may differ from those shown in this example, in particular the number and weight of the used sub-fields. These embodiments are considered to be further examples of this invention.

First, and for comparison, a practical example is presented where the principles of this invention are not applied:

In this example a sub-field organisation with 12 sub-fields is presented. The weights of the sub-fields are as follows:

1-2-4-8-16-32-32-32-32-32-32-32

256 video levels can be generated with this sub-field organisation as required in TV/Video technology. FIG. 1 illustrates the frame period and its subdivision in sub-fields. Each sub-field consists of the phases erase, scan and sustain as explained at the bottom of FIG. 1. Also ahead of the hard priming period there is an erasing period. In the figure the erasing period belonging to the hard priming period is depicted at the end of the last sub-field only for drawing purposes. The sub-field weights are indicated with numbers above the sub-fields. Ahead of the first sub-field there is shown a hard priming period in checkered pattern. This period is used in known PDP control implementations for a pre-excitation of the cells as explained above. For this period there is of course no sustain period as shown. This is one reason why this period is not a sub-field. Another reason is, that in this period all cells are addressed in parallel, whereas in the sub-field periods the cells are addressed line wise.

The frame period is illustrated slightly longer than all the sub-field periods and the hard priming periods together. This has the reason that for non-standard video sources the video line may be subject of jittering and to make sure that all sub-fields and the hard priming period fits into the jittering video line, the total amount of time for hard priming and all sub-fields is slightly shorter than a standard video line.

There are no self-priming sub-fields in this sub-field organisation (i.e. all sub-fields are addressed in the same way), and the best code for the level 32 is 000001000000, where all first 5 sub-fields have to be set to zero. If one wanted to use sub-fields for priming purposes in this example, one would have to use 6 self-priming sub-fields in order to make sure that a cell writing takes place for all non-zero code words. This would not be practical (too much extra addressing time for 6 self-priming sub-fields). Furthermore, this code is not a refreshing code: after the hard priming, there may be up to 5 sub-fields which are inactivated.

In the next example a sub-field organisation according to the invention is presented. Also in this example 12 subfields are used but with different sub-field weights. Again, 256 different video levels can processed with this sub-field organisation.

1-2-3-5-8-12-16-16-32-32-64-64

Figure 2:
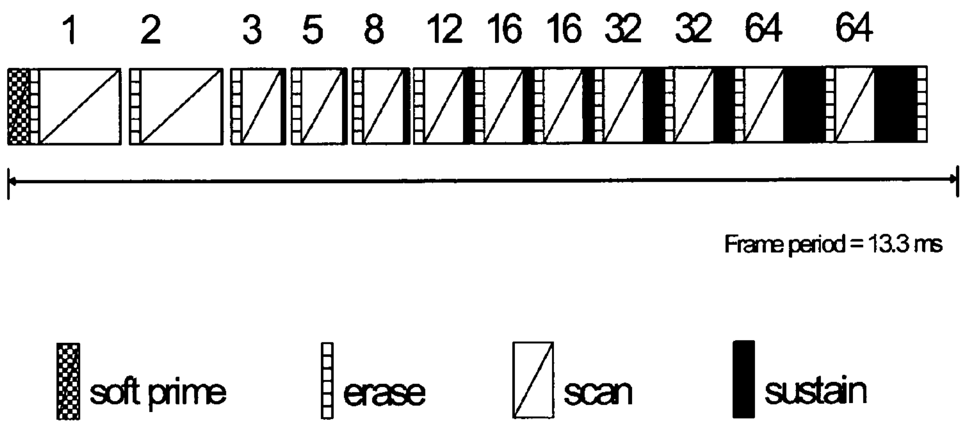
FIG. 2 shows a first example of a sub-field organisation according to the invention.

FIG. 2 illustrates the subdivision of the frame period in sub-fields according to this sub-field organisation. The first two sub-fields SPSF are self-priming sub-fields and the last 10 sub-fields RSF are refreshing sub-fields. Also in this example there is a priming period ahead of the sub-field periods. But notice is given that this soft priming period is shorter than the hard priming period in the example before. Current investigations revealed that with the present plasma technologies this soft priming period is necessary for a reliable plasma generation in the cells. If in future an advanced plasma technology has been developed, there is no longer a need for this soft priming period and the corresponding time can be used for other purposes, e.g. for adding another sub-field to the sub-field organisation or extending the sustain periods of the sub-fields or the like. With the chosen sub-field weights Fibonacci codes can be used (a given sub-field is never higher than the sum of the previous 2 sub-fields). For all codes it is assured that there is never more than one sub-field inactivated between two activated sub-fields. The 2 self-priming sub-fields SPSF have a longer addressing phase (scan time). In this example, the addressing phase of the self-priming sub-fields SPSF is approximately twice so long as the addressing phase of one of the remaining 10 refreshing sub-fields RSF.

Another example of a sub-field organization according to the invention is indicated by the following series of sub-field weights:

1-2-3-5-8-12-17-23-30-39-50-65

Also in this sub-field organization the first two sub-fields are self-priming sub-fields and the remaining sub-fields are refreshing sub-fields. Also this sub-field organization respects the rule that a given sub-field weight is not higher than the sum of the previous two sub-field weights. This example of a sub-field organization according to the invention is better optimized with respect to false contour effect compensation.

In the last two examples, by using self-priming sub-fields SPSF and refreshing sub-fields RSF, no hard priming pulse was required, and the addressing pulse of the last 10 sub-fields could be reduced compared to the first example. On a practical implementation, this reduction in addressing time of the refreshing sub-fields would probably be even more substantial than what is depicted in the above 2 figures. Even though self-priming sub-fields require more addressing time, in the second case there is more total time available for sustain pulses.

Figure 3:
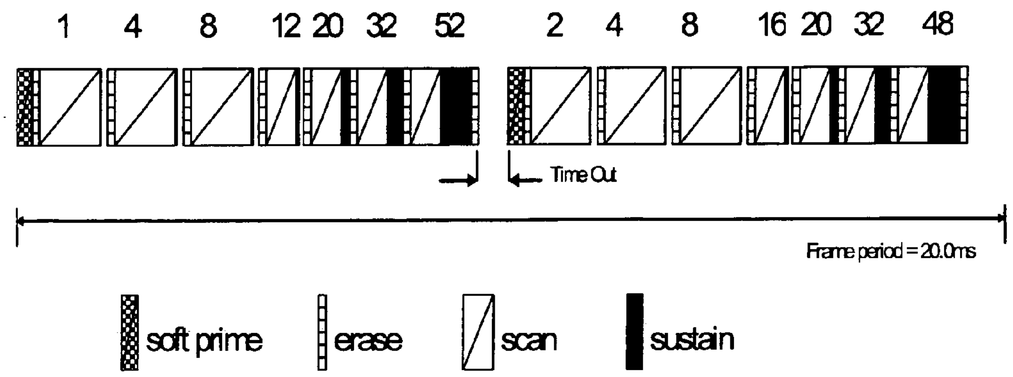
FIG. 3 shows a second example of a sub-field organisation according to the invention.

In FIG. 3 there is another example of a sub-field organization according to the invention. This example is optimized for the 50 HZ display modes when TV signals according to TV standards like PAL, SECAM are input. The large area flicker effect is the most disturbing effect in 50 Hz TV standards. That's why the 100 Hz upconverters are widely used in TV sets for compensating this effect. The operating principle of plasma displays is based on the generation of small light pulses in sub-fields with addressing, sustaining and erasing periods. This allows for a specific adaptation of the sub-field organization and sub-field coding for compensating the large area effect. The applicant has filed a European patent application for this solution with the application number 98115607.8-2205. The publication number of this application is EP-A-0982707. The principle behind the adaptation is that two groups of sub-fields are defined which are separated from each other by a certain amount of time and that the sub-fields are distributed over these groups in such a manner that the sub-field weights are distributed as equally as possible over the two groups. A frame period lasts 20 ms in 50 Hz TV standards. The effect of this adaptation is that the sub-field groups occur in a 10 ms raster which corresponds to 100 Hz upconversion. The large area flicker effect can be compensated very easily with this adaptation. For the disclosure of the details of this adaptation it is referred to above mentioned EP application.

FIG. 3 shows an example of a sub-field organization where the concepts of large area flicker reduction and self-priming and refreshing sub-fields are combined. The following sub-field organization with 14 sub-fields are considered as an example.

1-4-8-12-20-32-52 2-4-8-12-20-32-48

The frame period is 20 ms. Here, it is to be noted that the frame period in 50 Hz TV standards is 40 ms because of the interlace and only the fields occur in 20 ms raster. However, plasma displays are operated in progressive mode and therefore after interlace to progressive conversion the frames occur in 20 ms raster.

As before, it assumed that the video signal is digitalized with 8 bit words and that thus there are again 256 different video levels. The sub-fields are divided in 2 groups fitting within a 100 Hz raster. For both groups there are provided self-priming sub-fields and refreshing sub-fields. Sub-field coding is chosen so as to minimize the 50 Hz component, which means that for a pixel sub-field weights are distributed as equally as possible among the 2 groups. For encoding the weights should also be concentrated around the least significant sub-fields. If for example the video level 17 shall be coded, then the encoder will output a code word 10100000010000% instead of 10000000001000% where the sub-fields with the weights 1, 8, 8 are used instead of just 1 and 16.

The gap between the last sub-field of the first group and the first of the second group might be quite significative. For this reason, two soft priming pulses are used, one at the beginning of each sub-field group. Contrary to the 75 Hz example, in the 100 Hz example, the first 3 sub-fields are self-priming sub-fields because there are codes (e.g. for the video level 28) where the first 2 sub-fields in one or both groups are off). The last 4 sub-fields in each sub-field group are refreshing sub-fields and can be addressed faster.

The rule, that a sub-field weight should never be greater than the sum of the sub-field weights of two preceding sub-fields cannot be fulfilled with the sub-field organization shown in FIG. 3. But the violation of this rule is only in the third sub-field of the first group so that picture quality will not noticeably be effected.

Figure 4:
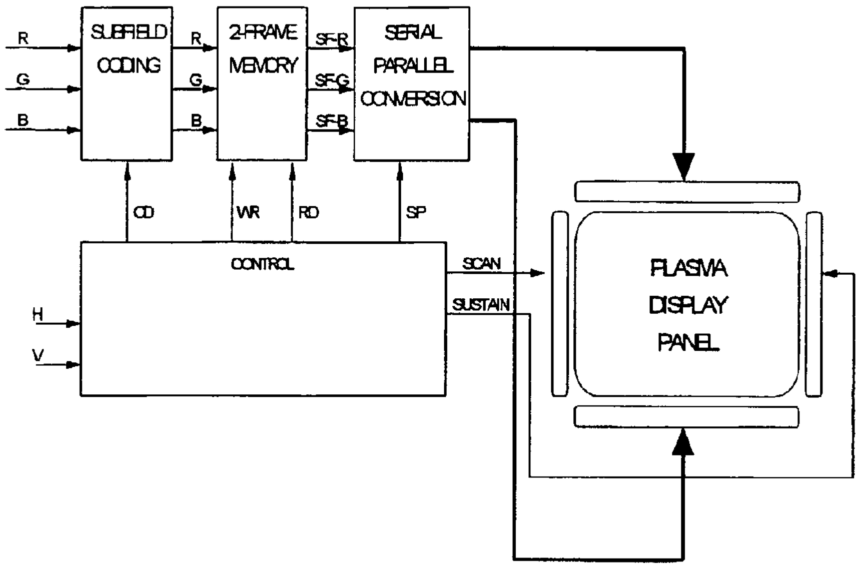
FIG. 4 shows a block diagram of a circuit implementation of the invention in a PDP.

In FIG. 4 a circuit implementation of the invention is illustrated. The control unit 10 selects the appropriate Fibonacci code for self-priming and refreshing to a given R, G, B video level by addressing the code table in sub-field coding unit 11 accordingly. It controls writing and reading to and from frame memory 13. Furthermore, it generates all scan and sustain pulses required by the heterogeneous (self-priming and refreshing) sub-field structure and also the soft priming pulses. The soft priming pulses are applied to all cells in parallel. Control unit 10 receives horizontal and vertical synchronising signals 10 for reference timing. Also, the serial parallel conversion process for addressing a plasma cell line, is also controlled by unit 10. Note, that for the self-priming sub-fields a slower scanning speed is used as for refreshing sub-fields.

The invention claimed is:

1. A method for processing video pictures for display on a display device having a plurality of luminous elements called plasma cells corresponding to the pixels of a picture, comprising the steps of: dividing the time duration of a video frame or video field into a plurality of sub-fields during which the luminous elements can be activated for light emission in pulses corresponding to a sub-field code word which is used for brightness control; and dividing a sub-field period into an addressing period, a lighting period and an erasing period, wherein, at least two different types of sub-fields are used within a frame period, the first of said different types of sub-fields being a self-priming sub-field (SPSF) and the second of said different types of sub-fields being a refreshing sub-field (RSF), wherein the self-priming sub-field/s are characterized by one or both of the following properties:

i.) the addressing period of a self-priming subfield is longer than the addressing period of a refreshing sub-field;

ii.) during the addressing period an increased writing voltage is applied to the luminous elements for pre-exciting the cells;

and wherein at least one self-priming sub-field is positioned ahead of the refreshing sub-fields in a frame period.

2. The method according to claim 1, wherein a specific sub-field organisation is used for sub-field coding, and the sub-field coding process fulfills one or both of the rules:

i.) for all input video levels that are different from zero a sub-field code word is selected in which at least one of the selfpriming sub-fields is activated;

ii.) for all input video levels that are different from zero a sub-field code word is selected in which never more than one consecutive sub-field is inactivated between two activated sub-fields.

3. The method according to claim 2, wherein the specific sub-field organisation is wherein the weights of the sub-fields when ordered according to size increase according to the rule that a given subfield weight is not higher than the sum of the weights of the previous two sub-fields.

4. The method according to claim 1, wherein the following sub-field organisation is used; the frame period is sub-divided in 12 sub-fields (SF), when the maximum activation period of a luminous element during a frame period has a relative duration of 256 time units, then the sub-fields (SF) have the following durations:

| Sub-field number | Duration/relative time units |
|---|---|
| 1 | 1 |
| 2 | 2 |
| 3 | 3 |
| 4 | 5 |
| 5 | 8 |
| 6 | 12 |
| 7 | 17 |
| 8 | 23 |
| 9 | 30 |
| 10 | 39 |
| 11 | 50 |
| 12 | 65. |

5. The method according to claim 1, wherein self-priming sub-field is further characterized by one or both of the following properties:

i.) the luminous elements are addressed twice in succession within the addressing period;

ii.) a soft priming period precedes a selfpriming sub-field, wherein during the softpriming period all luminous elements are written in parallel with higher voltage compared to the remaining sub-field periods.

6. The method according to claim 1, wherein the luminous elements are addressed line wise in the following writing order, where the underlined line numbers denote the second writing cycle within the addressing period:

1 234 . . . 479480123 . . . 480.

7. The method according to claim 1, wherein the luminous elements are addressed line wise in one of the following writing orders, where the underlined line numbers denote the second writing cycle within the addressing period:

1 21324354657687. . .

or:

1 2 314253647586. . . .

8. The method according to claim 1, wherein the sub-fields of a pixel are organised in two consecutive groups (G1,G2), with sub-field organisations in both groups being most similar as far as possible and having a time out period between the two groups of certain duration.

9. The method according to claim 8, wherein in each group one or more of the sub-fields are self-priming sub-fields and the remaining sub-fields are refreshing sub-fields.

10. The method according to claim 8, wherein in each group ahead of the sub-field periods a softpriming period is used for pre-exciting the cells.

11. The method according to claim 8, wherein the following sub-field organisation is used:

the frame period is sub-divided in 14 sub-fields, when the maximum activation period of a luminous element during a frame period has a relative duration of 256 time units, then the sub-fields in the two groups have the following durations:

| Sub-field number | Duration/relative time units |
|---|---|
| first group | |
| 1 | 1 |
| 2 | 4 |
| 3 | 8 |
| 4 | 12 |
| 5 | 20 |
| 6 | 32 |
| 7 | 52 |
| second group | |
| 1 | 2 |
| 2 | 4 |
| 3 | 8 |
| 4 | 16 |
| 5 | 20 |
| 6 | 32 |
| 7 | 48 |

wherein in each case the first three sub-fields are self-priming sub-fields and the remaining sub-fields are refreshing sub-fields.

12. The method for processing video pictures for display on a display device having a plurality of luminous elements called plasma cells corresponding to the pixels of a picture, comprising the steps of dividing the time duration of a video frame or video field into a plurality of sub-fields during which the luminous elements can be activated for light emission in pulses corresponding to a sub-field code word which is used for brightness control; and dividing a sub-field period into an addressing period, a lighting period and an erasing period, wherein, a specific sub-field organisation is used for sub-field coding, and the sub-field coding process fulfills the rule:

iii.) for all input video levels that are different from zero a sub-field code word is selected in which never more than one consecutive sub-field is inactivated between two activated sub-fields.

13. The method according to claim 12, wherein the specific sub-field organisation is characterized in that the weights of the sub-fields when ordered according to size increase according to the rule that a given subfield weight is not higher than the sum of the weights of the previous two sub-fields.

14. The method according to claim 1, wherein the method is performed in a plasma display panel control apparatus.

* * * * *